May 23, 1967  E. A. KOLM  3,321,648
PIEZOELECTRIC FILTER ELEMENT
Filed June 4, 1964  2 Sheets-Sheet 1

INVENTOR.
ERIC A. KOLM
BY
Blair & Buckles
ATTORNEYS

United States Patent Office 3,321,648
Patented May 23, 1967

3,321,648
PIEZOELECTRIC FILTER ELEMENT
Eric A. Kolm, Brookline, Mass., assignor to Sonus
Corporation, Cambridge, Mass.
Filed June 4, 1964, Ser. No. 372,482
3 Claims. (Cl. 310—8.2)

This invention relates to improvements in piezoelectric coupling elements. It relates more particularly to method and means for acoustically connecting together separate transducers to form a coupling element having improved frequency response characteristics.

My invention is concerned primarily with coupling elements of the type employing a pair of individual piezoelectric transducers mechanically coupled or sandwiched together. Each transducer has electrodes applied to opposite surfaces thereof. The input signal is applied between the electrodes of one transducer which causes the transducer to vibrate. The energy is acoustically coupled to the other transducer and the output signal appears between the opposite electrodes thereof. The coupling element has a natural frequency of internal resonance dependent primarily on the geometry of the transducers and tends to pass only signals having a selected passband. Most usually, such coupling elements employ axially polarized discoid transducers for which the primary frequency determining factor is their diameter. By controlling the diameters of the transducers, the device can be tuned so that it functions as a filter between two circuits, such as the first and second I.F. stages of a conventional receiver.

For purposes of illustration, this application will describe my invention as applied specifically to coupling elements employing the aforesaid discoid transducers. It will be understood, however, that the invention is equally applicable to other coupling elements utilizing a plurality of coupled together transducers of whatever shape. These coupling elements are described more fully in a copending application to Fowler et al., Ser. No. 75,321, assigned to the assignee of the present application.

One real problem connected with the aforesaid sandwich-type coupling elements has been the relatively low yield obtained during their manufacture. The reason for the high rejection rate has been due primarily to the poor frequency response characteristics of these devices. They possessed unwanted modes of vibration including spurious bending modes which gave rise to an irregular and unsymmetrical frequency response curve. The curve, instead of having a single very predominant peak representing the center frequency had a predominant peak and lesser spikes on each side thereof indicative of the aforementioned spurious vibrations. In addition, the cut-off characteristics of these devices were poor. As a result, unwanted frequencies were passed from the input to the output circuit, making it necessary at times to use additional filtering stages to obtain a frequency response curve having the desired shape. An attendant disadvantage of these prior coupling elements was that it was difficult to make a large number of such devices to have uniform response characteristics thus precluding their interchangeability in specific circuits. Also, different circuit applications require filters having different bandwidths. Heretofore it has been difficult to construct coupling elements with just the desired bandwidth to fill the particular need.

Some progress toward eliminating such unwanted responses has been made by employing improved bonding means to couple together the transducers. But such techniques, while improving the results, have not succeeded in completely solving the problem.

Accordingly, it is a principal object of this invention to provide a piezoelectric coupling element having a passband characterized by low attenuation at the center frequency and sharp cut-off characteristics.

It is a further object of this invention to provide a piezoelectric coupling element whose passband is shaped to provide greater sensitivity.

Another object of this invention is to facilitate the fabricating of coupling elements having a particular selected bandwidth.

A still further object of this invention is to provide a piezoelectric coupling element construction producing an increased yield.

It is a more specific object of this invention to make a coupling element empolying an acoustical cushion to absorb energy due to unwanted vibrations in the coupling element.

Other objects of the invention will in part be obvious and will in part appear hereinafter.

The invention accordingly comprises the several steps and the relation of one or more of such steps with respect to each of the others, and the article possessing the features, properties, and the relation of elements, which are exemplified in the following detailed disclosure, and the scope of the invention will be indicated in the claims.

For a fuller understanding of the nature and objects of the invention, reference should be had to the following detailed description taken in connection with the accompanying drawings, in which.

In general, my improved coupling element employs a pair of similar acoutical transducers mechanically coupled together through an acoustical cushioning member interposed between the two transducers. An input signal applied to opposite surfaces of one of the transducers causes that to vibrate. The acoustical energy is coupled through the cushioning member to the other transducer, and the output signal appears at opposite surfaces of that transducer. The cushioning member positioned between the two transducers modifies the acoustical coupling between the two transducers by absorbing acoustical energy due to spurious vibrational modes. As a result, it shapes the element's response curve, giving that a prominant peak at the center frequency and a relatively sharp cut-off characteristic on each side of that frequency. These coupling elements can be constructed to have a passband of the desired width merely by selecting for the cushioning member a material having the proper stiffness.

Figure 1:
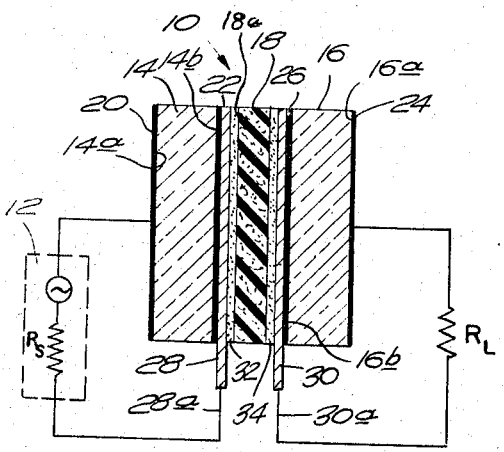
FIG. 1 is a schematic representation of a circuit incorporating a coupling element embodying the principles of this invention.

Refer now to FIG. 1 of the drawings, which shows a frequency selective circuit incorporating the features of my invention, it includes a coupling element indicated generally at 10 for coupling energy from a source 12 including an internal impedance represented as a resistor $R_s$, to a load indicated by the resistor $R_L$. The thicknesses of the various elements have been exaggerated somewhat for clarity.

The coupling element 10 comprises more specifically a pair of polarized piezoelectric transducers 14 and 16 juxtaposed on opposite sides of a resilient acoustical cushioning member 18 which will be described more particularly later. Electrodes 20 and 22 are formed on the outer and inner faces 14a and 14b respectively of transducer 14. Similar electrodes 24 and 26 are formed on the outer and inner surfaces 16a and 16b respectively of transducer 16. The electrodes 20–24 are formed in the usual way by a silver suspension process or by application in a glass frit.

A conductor 28 having a lead 28a is soldered or otherwise electrically and mechanically coupled to inner electrode 22 of transducer 14. A similar conductor 30 having a lead 30a is likewise affixed to inner conductor 26 of transducer 16. Conductors 28 and 30 are easily formed from metal foil and desirably cover the entirety of the opposing electrodes. The conductors together with their corresponding electrodes constitute electrode means. Conductors 28 and 30 are bonded to the opposite faces 18a and 18b of cushioning member 18 by thin films 32 and 34 respectively of a hard-setting adhesive capable of transmitting acoustical energy with minimum loss.

The adhesive films 32 and 34 may consist of an epoxy resin, but more desirably they consist of a modified cyanoacrylate adhesive such as is manufactured by Eastman Chemical Products, Inc., under its trademark "Eastman 910." This adhesive produces a particularly thin, yet strong bond between dissimilar surfaces. It also sets very quickly and with substantially no change in volume so that the bond has a relatively small effect on the overall operational characteristics of the coupling element. Preferably the entire opposing surfaces of conductors 28 and 30 are bonded to the cushioning member 18 to assure maximum acoustical coupling betwen the two transducers 14 and 16.

An alternating voltage signal from source 12 is applied to one transducer, say transducer 14, by connecting source 12 to electrode 20 and lead 28a. The load $R_L$ is, in turn, connected to electrode 24 and lead 30a of the other transducer 16. There is thus electrical isolation between source 12 and load $R_L$.

Figure 2:
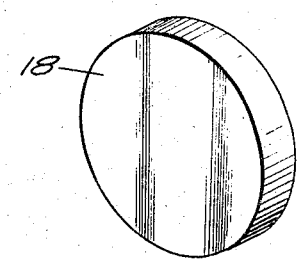
FIG. 2 is an enlarged perspective view of an acoustical cushioning element employed in the coupling element of FIG. 1.

FIG. 2 shows the aforementioned cushioning member 18 in greater detail. It is seen to be relatively thin, in the order of 1/64 to 1/16 inch, and has the same shape (here in discoid) as conductors 28 and 30. The member 18 is constructed of a relatively stiff, rubber-like material. Examples of such materials suitable for use in this invention are "neoprene," "Corprene" and silicon rubbers.

Still referring to FIGS. 1 and 2, an alternating voltage from source 12 causes transducer 14 to vibrate. For the relatively thin, discoid transducers illustrated herein, the vibration is primarily in the radial direction. However, there are produced also other unwanted, vibrational modes which, although less prominent, would normally be coupled to transducer 16 and adversely affect the frequency response characteristics of the device.

Under this invention, the acoustical energy from these unwanted vibrations is absorbed by cushioning member 18. But the predominating acoustical energy produced by vibrations at the natural frequency of internal resonance of the coupling element is coupled through cushioning member 18 to transducer 16 causing that to vibrate also. There, the acoustical energy is transferred in accordance with known piezoelectric principles and appears as a voltage across electrode 24 and lead 30a. The response curve for the coupling element 10 is thus shaped to reflect a material reduction in the coupling of acoustical energy from unwanted vibrations in the element. The resulting curve is characterized by a pronounced peak at the center frequency (which corresponds with the natural frequency of the coupling element) and a relatively sharp cut-off characteristic on each side of that frequency.

Figure 3:
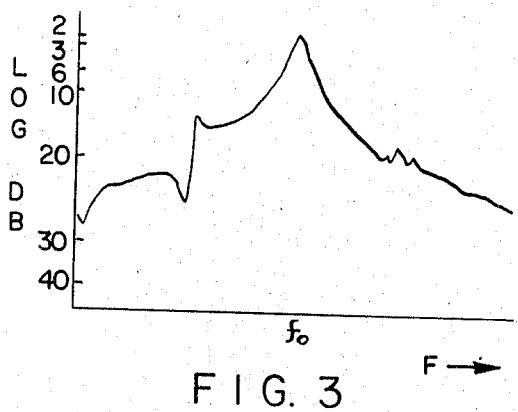
FIG. 3 is a graph of the output voltage from a prior coupling element of the type here concerned, plotted as a function of frequency.

FIG. 3 is a simplified graph of the output voltage (log scale) plotted as a function of frequency for a conventional coupling element of the type here concerned (but without my acoustical cushioning member) and connected in the circuit of FIG. 1. The transducers 14 and 16 are each 0.025 inch thick and 0.210 inch in diameter. The ceramic material has a dielectric constant of 1200 and a mechanical Q of 350. The coupling element has been polarized by a direct voltage of 1500 volts. The FIG. 3 graph represents a 100 kc. sweep. The frequency $f_0$ is approximately 262 kcs.; the internal resistance $R_s$ of the source 12 is approximately 10,000 ohms and the load resistance $R_L$ is between 200 and 5,000 ohms.

The rather irregular frequency characteristic curve indicates the presence of spurious vibrational modes in the coupling element. Further, the graph indicates rather poor cut-off characteristics. At the 6 db points, the bandwidth is approximately 9.6 kc. The output voltage from the coupling element is 30 db below the level at $f_0$ at approximately 113.4 kcs. from the center frequency (off scale). Thus, the 30 db bandwidth is almost twelve times the 6 db bandwidth.

Figure 4:
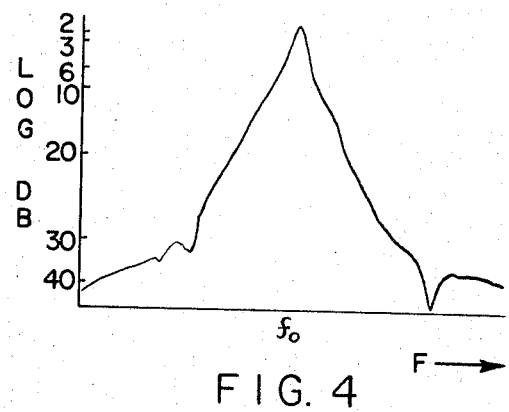
FIG. 4 is a graph similar to that of FIG. 3 of the output voltage from a coupling element embodying the principles of this invention, also plotted as a function of frequency.

FIG. 4 shows a similar plot for the coupling element of FIG. 1 employing an acoustical cushioning member 18 between the two transducers 14 and 16. The remaining circuit parameters are the same as above. In this example, the cushioning member 18 is constructed of a single "neoprene" disk, 55 durometer, approximately 1/64 inch thick. At the 6 db points, the bandwidth is 7.6 kc., while the 30 db bandwidth is 43.5 kc. The 30 db bandwidth is, then, only five times the 6 db bandwidth. The curve of FIG. 4 exhibits a sharp resonance at the center frequency corresponding to the natural internal resonance frequency of the coupling element. Furthermore, it has relatively sharp cut-off characteristics on both sides of the center frequency.

Figure 5:
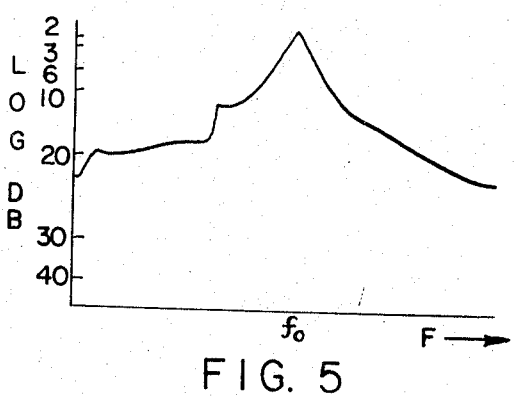
FIG. 5 is a similar graph of a prior coupling element subjected to a higher polarization voltage than that concerned in FIGS. 3 and 4.

FIG. 5 shows a graph, similar to that of FIG. 3, for a conventional coupling element connected in a circuit having the same parameters set out above except that the polarizing voltage is 2500 volts. Again, the center frequency is assumed to be 262 kc. It is seen from this graph that employing a higher polarizing voltage for the prior coupling elements decreases their sensitivity. The 6 db bandwidth is 11.3 kc. while the 30 db bandwidth is 219.7 kc. (off scale), or more than nineteen times that of the 6 db bandwidth.

Figure 6:
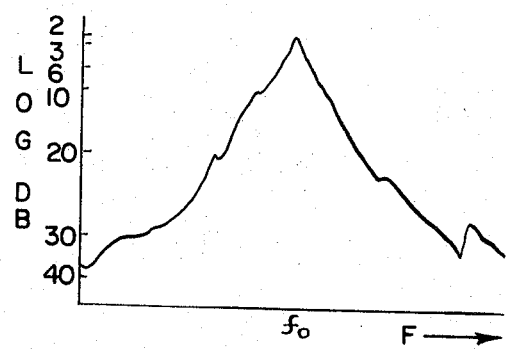
FIG. 6 is a similar graph for a modified form of my coupling element subjected to the higher polarization voltage.

FIG. 6 shows a similar graph for a coupling element employing a cushioning member 18 connected on the same circuit and operated at 2500 volts. In this case, however, cushioning member 18 is a 1/32 inch thick, 45 durometer, "Corprene" disk. This coupling member is also polarized by 2500 volts. Again, the cushioning member 18 shapes the response curve so as to improve the skirt selectively on both sides of the center frequency. In this example, the 6 db bandwidth is 9.6 kc. while the 30 db bandwidth is 86.5 kcs., only nine times greater.

Figure 7:
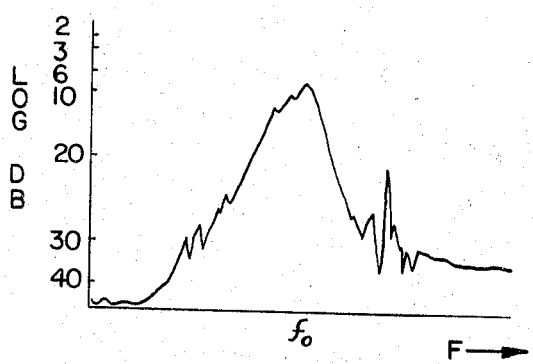
FIG. 7 is a graph similar to FIG. 6 for another modified form of my coupling element.

FIG. 7 shows still another similar graph of a coupling element employing an acoustical cushioning member 18 approximately 1/32 inch thick and made of 65 durometer silicon rubber. This coupling member is also polarized by a direct voltage of 2500 volts. It produces a response curve again characterized by a sharp peak at the center frequency and relatively sharp skirt selectively as compared with a coupling element having no cushion as represented by the graph in FIG. 3.

Figure 8:
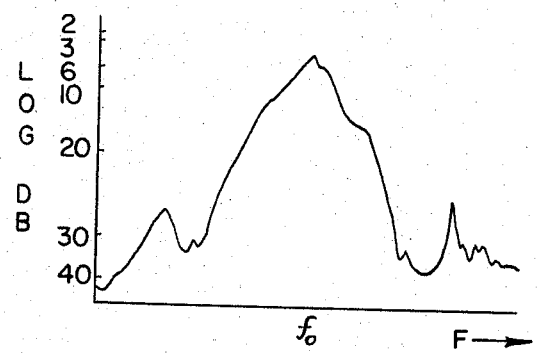
FIG. 8 is a similar graph for still another modified form of my invention.

FIG. 8 illustrates a similar response curve for still another coupling member employing a 1/16 inch thick "neoprene" cushioning member. The 6 db bandwidth is 10.2 kcs., while the 30 db bandwidth is 49.9 kc., or about five times as great.

FIGS. 4, and 6–8 all illustrate the advantages to be gained by using my acoustical cushioning member. The member 18 absorbs a large part of the unwanted vibrations that normally would be coupled from the input to the output transducer and adversely affect the response curve. In all cases, the transfer of power from the transducer 14 through the acoustical cushion 18 to the transducer 16 is relatively efficient within the passband of the particular coupling member, but is drastically attenuated outside the passband.

As the durometer or stiffness of the material from which the coupling element is made is increased, the effect becomes more pronounced. The relatively stiff cushions whose effect is illustrated by the FIGS. 7 and 8 graphs, produce a passband which is quite wide and has good skirt selectivity. These stiffer cushions may, however, also give rise to spurious responses (indicated by spikes) which may have to be eliminated by other known means.

The curves of FIGS. 4 and 6–8 show, in addition, that the advantageous effects of the member become less pronounced as the thickness of the cushioning member 18 increases. Also, as the thickness of member 18 increases more acoustical energy is absorbed by it and the efficiency of the device decreases. Thus, the acoustical cushion should be fairly thin, in the order of $\frac{1}{64}$ inch, for best results. It must be mentioned, however, that the decrease in sensitivity of the coupling element response with higher polarizing voltages is much less marked than is the case with conventional coupling elements. This is readily apparent from a comparison of FIGS. 3 and 5 on the one hand and FIGS. 4 and 6–8 on the other.

As seen from the foregoing, I have improved the art of electrical coupling elements or filters by employing a plurality of transducers mechanically coupled together with an acoustical cushioning member interposed between them. The cushioning member absorbs much of the energy produced by spurious vibrations in the transducers and thus shapes the response curve so that it is characterized by a sharp peak at the center frequency and relatively sharp cut-off characteristics, i.e. a minimum and uniform attenuation within the passband and high attenuation outside of the band, even when high polarizing voltages are employed. And, by selecting cushions of proper stiffness, the width of the passband may be easily shaped to suit particular circuit applications.

With this invention such coupling elements can now be manufactured in large quantity having the same desired frequency response characteristics. The yield for such devices is increased appreciably with consequent savings in manufacturing costs.

It will be appreciated that while I have disclosed a certain set of circuit parameters and geometrical configurations, other values may be employed without departing from the spirit of this invention.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

I claim:

1. A piezoelectric coupling element having a resonant frequency and comprising a first discoid piezoelectric transducer having opposite surfaces and capable of vibrating at frequencies including said resonant frequency, a second discoid piezoelectric transducer having opposite surfaces and capable of vibration at frequencies including said resonant frequency, electrode means affixed to said surfaces, a thin discoid relatively stiff rubber-like cushioning member positioned between said transducers with its opposite faces facing said electrode means, means for bonding each face of said cushioning member to the adjacent one of said electrode means so as to mechanically couple together the first and second transducers, said cushioning member filtering out the spurious vibrations of said first transducer so that said second transducer will vibrate at said resonate frequency.

2. A piezoelectric coupling element as defined in claim 1 wherein said cushioning member is from $\frac{1}{64}$ to $\frac{1}{16}$ inch thick and has a stiffness of from 45 to 65 durometer.

3. A piezoelectric coupling element as defined in claim 2 and further including means for electrically connecting the electrode means of one of said transducers to a source of alternating voltage and means for connecting the electrode means of the other of said transducers to a load.

References Cited by the Examiner

UNITED STATES PATENTS

| | | | |
|---|---|---|---|
| 2,368,609 | 1/1945 | Burkhardt | 310—8 |
| 2,434,143 | 1/1948 | Chilowsky | 210—8 |
| 2,614,144 | 10/1952 | Howatt | 310—8 |
| 2,759,241 | 8/1956 | Sturm | 310—8 |
| 3,174,122 | 3/1965 | Fowler | 333—72 |

MILTON O. HIRSHFIELD, *Primary Examiner.*

J. D. MILLER, *Assistant Examiner.*